United States Patent [19]

Yanagisawa

[11] Patent Number: 5,606,852
[45] Date of Patent: Mar. 4, 1997

[54] WAVED-SHAPED, CURLED STEEL CORD FOR REINFORCING RUBBER ARTICLES AND PNEUMATIC RADIAL TIRE USING THE SAME

[75] Inventor: Manabu Yanagisawa, Tokyo, Japan

[73] Assignee: Bridgestone Corporation, Tokyo, Japan

[21] Appl. No.: 669,820

[22] Filed: Jun. 26, 1996

Related U.S. Application Data

[63] Continuation of Ser. No. 225,302, Apr. 8, 1994, abandoned.

[30] Foreign Application Priority Data

Apr. 9, 1993 [JP] Japan ..................... 5-083535

[51] Int. Cl.⁶ .................. D02G 3/02; D02G 3/36
[52] U.S. Cl. .................. 57/207; 57/210; 57/212; 57/311; 57/902
[58] Field of Search .................. 57/902, 210, 212, 57/218, 207, 206, 311; 152/451, 527, 556

[56] References Cited

U.S. PATENT DOCUMENTS

| | | | |
|---|---|---|---|
| 5,295,346 | 3/1994 | Bundo et al. | 57/311 |
| 5,319,915 | 6/1994 | Kobayashi et al. | 57/902 |
| 5,351,470 | 10/1994 | Shinmura | 57/311 |

FOREIGN PATENT DOCUMENTS

| | | | |
|---|---|---|---|
| 0462716 | 12/1991 | European Pat. Off. | |
| 462716 | 12/1991 | European Pat. Off. | 57/902 |
| 528637 | 2/1993 | European Pat. Off. | 57/902 |
| 551124 | 7/1993 | European Pat. Off. | 57/902 |
| 2476548 | 8/1981 | France . | |
| 2676466 | 11/1992 | France . | |
| 591790 | 1/1984 | Japan . | |
| 60-38208 | 2/1985 | Japan . | |
| 5-51884 | 3/1993 | Japan | 57/902 |
| 551884 | 3/1993 | Japan | 57/902 |

OTHER PUBLICATIONS

Research Disclosure, No. 175, Nov. 1978, Emsworth GB, pp. 26–28 17534 'Process for the manufacture of a strand, as well as a strand made according to this process, and elastomer or synthetic material objects reinforceed with such strands'.

*Primary Examiner*—William Stryjewski
*Attorney, Agent, or Firm*—Sughrue, Mion, Zinn, Macpeak & Seas

[57] ABSTRACT

A steel cord for reinforcing rubber articles and a pneumatic radial tire having a belt layer using the same, in which the steel cord comprises a core made of a steel filament wave-shaped in a plane (crimped) and turned (curled) and 5–8 sheath filaments wound around the core in the same direction as the turn direction of the core. The wavelength $\lambda c$ of the core is preferably defined as $8\,dc \leq \lambda c \leq 30\,dc$ when the diameter of the core filament is dc, and the turn-number nc of the core around the center axis of the core per one wave-length of the core is preferably defined as $0.12 \leq nc \leq 0.85$ (turn/pitch).

8 Claims, 2 Drawing Sheets

WAVED-SHAPED, CURLED STEEL CORD FOR REINFORCING RUBBER ARTICLES AND PNEUMATIC RADIAL TIRE USING THE SAME

This is a Continuation of application Ser. No. 08/225,302 filed Apr. 8, 1994 now abandoned.

BACKGROUND OF THE INVENTION

1. Field of the Invention

The present invention relates to a steel cord for reinforcing rubber articles such as pneumatic tires, industrial belts and the like. More particularly it relates to rubber articles and their steel cord having enhanced rubber penetration property, enhanced resistance to cut separation indicating tire durability, and good resistance to BES (belt edge separation). The invention also particularly relates to pneumatic radial tires using such steel cord.

2. Description of the Prior Art

Products reinforced with steel cords are liable to suffer from corrosion of the steel filament caused by water entering the products and thereby the durability and life of the products are lowered.

For example, when steel cords used in a belt of a tire have a void and the tire tread are subjected to damage reaching the belt, water entering the belt spreads along the longitudinal direction of the cord through the voids in the steel cords. As a result, rust formed due to water also diffuses and the adhesion between rubber and steel cord is lowered at that portion. Finally, separation phenomena occurs.

In order to prevent such corrosion propagation, there is proposed a cord structure in which rubber can sufficiently penetrate into the inside of the cord through gaps between adjacent metal filaments by vulcanization under pressure.

Japanese Patent Application Laid-open Nos. 8208/1985 and 1790/1984 disclose one of the above-mentioned cord structures, a so-called "1+5 structure" cord composed of one core filament and five sheath filaments, having gaps between sheath filaments and rubber and can easily penetrate into the gaps. Further this cord can be produced by one-step twisting and thereby the productivity is high.

Indeed the average sheath gaps are sufficient in such a cord structure, but deviation occurs in the arrangement of sheath filaments and there are formed attaching portions of the filaments resulting in forming of portions where rubber does not penetrate due to a fluctuation in the manufacturing procedure.

The objects of the present invention are to provide a steel cord having remarkably enhanced rubber penetration property by changing the structure of a core filament and good resistance to BES, and to provide a pneumatic radial tire using the same.

SUMMARY OF THE INVENTION

The present inventor has conducted intensive research and studies to overcome the above-mentioned problems and found that it is possible to enhance the rubber penetration property and the resistance to cut separation and also to enhance the resistance to BES property by using a crimped-curled core made of a core filament wave-shaped in a plane with a suitable wavelength and curled with suitable turn number per one wavelength, and as a result the present invention has been accomplished.

The present invention provides a steel cord for reinforcing rubber articles, which comprises a crimp-curled core made of a steel filament wave-shaped in a plane (crimped) and turned (curled) and 5–8 sheath filaments wound around the core in the same direction as the turn direction of the core.

The wavelength $\lambda c$ of the core-crimp is preferably defined as $8\ dc \leq \lambda c \leq 30\ dc$ when the diameter of the core filament is $dc$, and the turn-number $nc$ of the core around the center axis of the core per one wave-length of the core-crimp is preferably defined as $0.12 \leq nc \leq 0.85$ (turn/pitch).

The core filament and the sheath filaments preferably comprise steel thin wire which contain carbon in an amount of 0.80–0.85% by weight.

The invention in another aspect provides a pneumatic radial tire having a belt layer using the steel cord according to the first aspect of the invention.

DESCRIPTION OF THE PREFERRED EMBODIMENTS

Figure 1A:
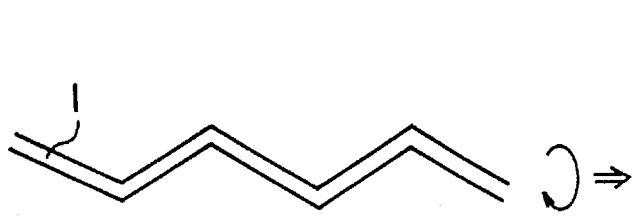
FIG. 1(A) is a schematic plane section of a core filament wave-shaped in a plane (crimped)
Figure 1B:
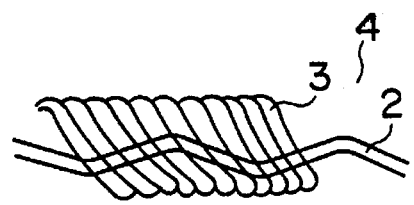
FIG. 1(B) is a schematic plane section of a crimped-curled core obtained by making the core filament of FIG. 1(A) turned around the center axis of the core (curled) and sheath filaments wound around the core in the same turn direction as the core.
Figure 1C:
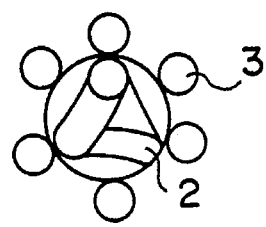
FIG. 1(C) is a schematic cross-section of a crimped-curled core steel cord cut along the vertical plane to the turn axis of FIG. 1(B)
Figure 2:
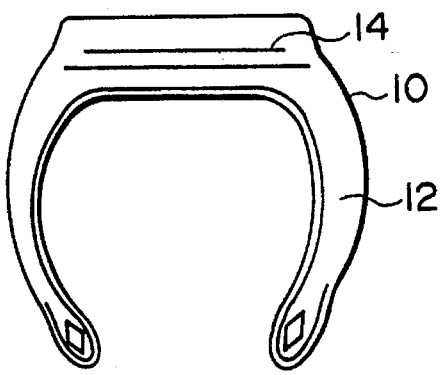
FIG. 2 is a schematic cross section of a pneumatic radial tire indicating the position of a belt using the steel cord according to the present invention.

According to the invention, it is preferable for a pneumatic radial tire 10 having a carcass 12 and a belt 14 (see FIG. 2) to use a steel cord 4 having one crimped-curled core 2 and 5–8 sheath filaments 3 and having a core filament diameter $dc$ of 0.15–0.48 min.

Figure 3:
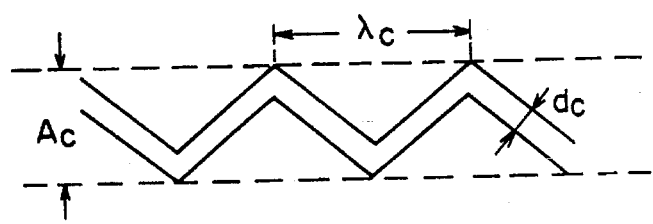
FIG. 3 is a schematic plane section illustrating the definition of the wavelength $\lambda c$, the amplitude $Ac$ and the core filament diameter $dc$ of the crimped-curled core.

A crimped-curled core 2 is wave-shaped in a plane and it is preferable that the amplitude $Ac$ defined in FIG. 3 is within the range described as follows when, for example, 1+5 means having one core and five sheath filaments:

1+5  $1.12\ dc \leq Ac \leq 2.0\ dc$ (mm)

1+6  $1.12\ dc \leq Ac \leq 2.5\ dc$ (mm)

1+7  $1.42\ dc \leq Ac \leq 2.8\ dc$ (mm)

1+8  $1.74\ dc \leq Ac \leq 3.12\ dc$ (mm)

When Ac is more than this maximum value, the cord properties become poor to cause, for example, projection of the core 2 from the gap between sheath filaments. When Ac is less than the minimum value, the rubber penetration property is insufficient.

The wavelength $\lambda c$ of the wave crimp of the core 2 (defined in FIG. 3) is defined as $8\,dc \leq \lambda c \leq 30\,dc$. When $\lambda c$ is less than 8 dc, it is not preferable in manufacturing because shaping pitch becomes too short and the core 2 easily breaks.

The turn number nc of the core 2 around the center axis of the core 2 per one wavelength of the core crimp is defined as $0.12 \leq nc \leq 0.85$ (turn/pitch). When nc is less than 0.12, it is difficult to form the core 2 into a three-dimensional shape.

The invention will be further described with reference to the following illustrative Examples.

There were prepared tires using the cords described in Table 1, which were then evaluated in respect of resistance to cut separation (average length of corrosion) and resistance to BES (crack linkage percentage), and the results of such evaluation are also given in Table 1.

TABLE 1

|  | Prior Example | Comparative Example 1 | Example 1 | Example 2 | Example 3 | Example 4 | Example 5 | Example 6 | Example 7 | Example 8 | Comparative Example 2 |
|---|---|---|---|---|---|---|---|---|---|---|---|
| Structure | 1 + 6 | 1 + 6 | 1 + 6 | 1 + 6 | 1 + 6 | 1 + 6 | 1 + 6 | 1 + 6 | 1 + 5 | 1 + 7 | 1 + 7 |
| Core Shape | straight | crimped- | crimped-curled | crimped-curled | crimped-curled | crimped-curled | crimped-curled | crimped-curled | crimped-curled | crimped-curled | crimped-curled |
| Filament Diameter (mm) | 0.23 | 0.23 | 0.26 | 0.26 | 0.23 | 0.23 | 0.23 | 0.23 | 0.24 | 0.22 | 0.22 |
| Carbon content percentage | 0.82 | 0.82 | 0.82 | 0.82 | 0.82 | 0.82 | 0.82 | 0.82 | 0.82 | 0.82 | 0.82 |
| Ac/dc | 1.0 | 1.62 | 1.2 | 1.5 | 1.2 | 1.14 | 2.0 | 2.0 | 1.14 | 2.0 | 1.42 |
| $\lambda c/dc$ | $\infty$ | 16.2 | 8.0 | 12.0 | 16.2 | 16.2 | 20 | 30 | 20 | 20 | 31 |
| nc(turn/pitch) | 0 | 0 | 0.12 | 0.12 | 0.33 | 0.5 | 0.85 | 0.85 | 0.33 | 0.5 | 0.90 |
| Twisting Machine* | Bun | Tub | Bun | Bun | Bun | Bun | Tub | Tub | Tub | Tub | Tub |
| Core periphery (mm) | 0.72 | 0.87 | 1.05 | 1.32 | 1.00 | 1.16 | 1.63 | 1.60 | 0.99 | 1.95 | 1.02 |
| Rubber Penetration Percentage (%) | 20 | 80 | 95 | 90 | 90 | 90 | 85 | 83 | 90 | 80 | 20 |
| Resistance to cut separation (average length of corrosion) | 70 | 20 | 7 | 10 | 15 | 10 | 15 | 17 | 12 | 15 | 0 70 |
| Resistance to BES (crack linkage percentage) | 20 | 40 | 0 | 0 | 5 | 10 | 10 | 10 | 15 | 15 | 70 |

*Bun: Buncher-machine
Tub: Tubular-machine

When nc is more than 0.85, the resistance to fatigue due to the twisting of the core 2 is lowered.

The twisting direction of the sheath filaments 3 is the same as the turned direction of the core crimp. This is because, when the respective directions are different, the fretting property including wear-corrosion becomes large by point attachment, and because, when the respective directions are the same, manufacturing is easy.

The number n of the sheath filaments 3 is selected within 5–8 and the 1+6 structure is preferable. This is because the rubber penetration efficiency is good and the weight can be lowered when strength per unit area of the cloth-like composite is constant.

By selecting the carbon content to be from 0.80–0.85%, the strength per one cord is enhanced, and the weight can be reduced when its specific strength is constant. Moreover the resistance to BES is enhanced by widening the space between the cords 4 because the cord diameter can be reduced when the cord structure and the strength per one cord are equal.

Figures 4A, 4B:
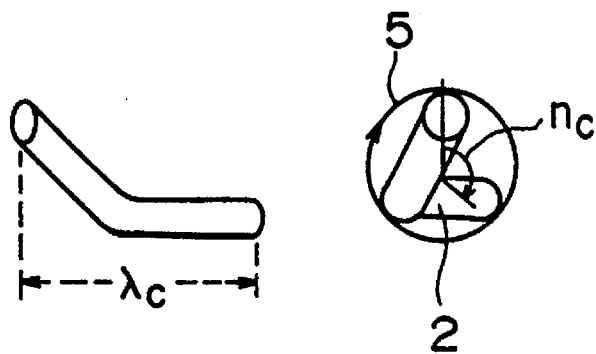
FIG. 4 is a schematic cross-section illustrating the definition of the periphery of the cross-section of the crimped-curled core filament and the turn number $nc$ of the core around the center axis of the core per one wavelength of the core crimp.

The rubber penetration property is remarkably enhanced and the resistance to cut separation indicating a kind of tire durability is enhanced by making core filament 1 crimped-curled. The periphery 5 of the cross-section of the core 2 is lengthened (see FIG. 4) and rubber can easily penetrate between sheath filaments 3 because the crimped-curled core 2 is three-dimensional. Further the space between cords 4 is lengthened when the strength is constant and the resistance to BES indicating other kind of durability is enhanced because the maximum cord diameter can be reduced when the core periphery 5 is constant.

Figure 5:
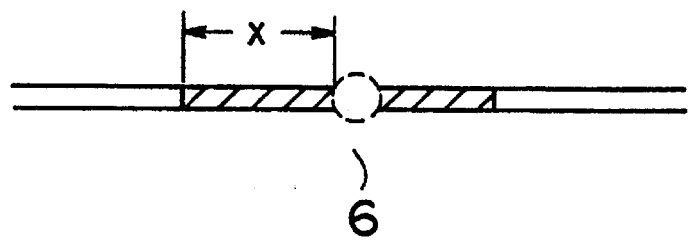
FIG. 5 is an explanatory drawing of definition of the corrosion length x indicating the resistance to cut separation.
Figure 6:
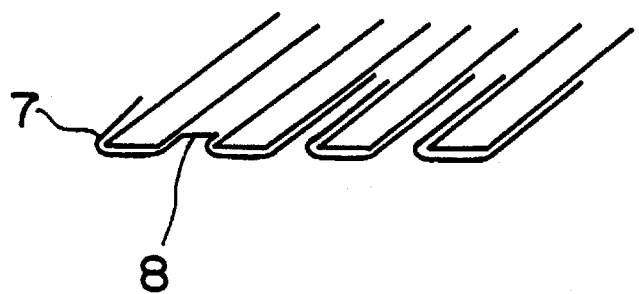
FIG. 6 is an explanatory drawing of a belt edge portion showing crack linkage in a test of the resistance to BES.

Tire size 185R14 LTR (light truck radial)
Mileage 30,000 km
Evaluating method
(1) Resistance to cut separation The average corrosion length (x in FIG. 5) of a cut portion 6 of the outermost belt of the two after mileage of 30,000 km is measured.
(2) Resistance to BES The crack linkage ratio of the outermost belt after mileage of 30,000 km is measured. For example, in FIG. 6, cracks 7 and a crack linkage portion 8 are shown.

The crack linkage ratio=Number of crack linkage portion 8 between cord-cord/Total number of the portions between cord-cord (%).

The smaller the linkage ratio is, the better the result.

Since the core filament of the steel cord is crimped-curled and the wavelength and the turn number of the core around the center axis of the core per one wavelength is appropriately determined, the rubber penetration property is remarkably enhanced and the resistance to cut separation indicating a kind of tire durability is enhanced. Since the core filament is a three-dimensional arrangement, the core periphery in a cross-section is lengthened and rubber can easily penetrate between sheath filaments. The space between cords when the strength is constant is lengthened and the resistance to BES indicating other kind of durability is enhanced because the cord diameter can be reduced even when the core periphery is constant.

While the invention has been particularly shown and described with reference to certain preferred embodiments thereof, it will be understood by those skilled in the art that various changes and modifications may be made without departing from the spirit and scope of the invention.

I claim:

1. A steel cord for reinforcing rubber articles, which consists of a single core filament made of a steel wave-shaped in a plane and curled about a center axis formed by an imaginary column constructed by curling said single core filament and 5–8 sheath filaments wound around the core in the same direction as a curling direction of the single core filament.

2. The steel cord according to claim 1, wherein a wavelength $\lambda c$ of said core taken as said wave-shaped in a plane is defined as $8\ dc \leq \lambda c \leq 30\ dc$ when the diameter of the single core filament is dc, and a turn-number nc of the curl of said core around a center axis of the core per one wavelength of the core is defined as $0.12 \leq nc \leq 0.85$ (turn/pitch).

3. The steel cord according to claim 1, wherein the core filament and the sheath filaments are steel thin wire which contain carbon in an amount of 0.80–0.85% by weight.

4. The steel cord according to claim 1, having a 1+6 structure comprising one core filament and six sheath filaments wherein $1.12\ dc \leq Ac \leq 2.5\ dc$ (mm) where Ac is an amplitude of the wave-shape of said core and dc is the diameter of the core filament.

5. A pneumatic radial tire having a belt layer using steel cord, which said steel cord consists of a single core filament made of a steel wave-shaped in a plane and curled about a center axis formed by an imaginary column constructed by curling said single core filament and 5–8 sheath filaments wound around the core in the same direction as a curling direction of the single core filament.

6. The tire according to claim 5, wherein said steel cord is such that a wavelength $\lambda c$ of said core taken as said wave-shaped in a plane is defined as $8\ dc \leq \lambda c \leq 30\ dc$ when the diameter of the single core filament is dc, and a turn-number nc of the curl of the core around a center axis of the core per one wavelength of the core is defined as $0.12 \leq nc \leq 0.85$ (turn/pitch).

7. The tire according to claim 5, wherein said steel core is such that the core filament and the sheath filaments are steel thin wire which contain carbon in an amount of 0.80–0.85% by weight.

8. The tire according to claim 5, wherein said steel cord has a 1+6 structure comprising one core filament and six sheath filaments wherein $1.12\ dc \leq Ac \leq 2.5\ dc$ (mm) where Ac is an amplitude of the waveshape of said core and dc is the diameter of the core filament.

\* \* \* \* \*